(12) United States Patent
Mazzei et al.

(10) Patent No.: US 7,234,765 B1
(45) Date of Patent: Jun. 26, 2007

(54) VEHICLE DOOR SILL

(75) Inventors: Anke Mazzei, Encinitas, CA (US);
Richard Plavetich, Laguna Beach, CA (US); John Cupit, Olivehain, CA (US)

(73) Assignee: Nissan Design America, Inc., San Diego, CA (US)

( * ) Notice: Subject to any disclaimer, the term of this patent is extended or adjusted under 35 U.S.C. 154(b) by 0 days.

(21) Appl. No.: 11/317,677

(22) Filed: Dec. 23, 2005

(51) Int. Cl.
*B60J 10/08* (2006.01)
*B60J 1/17* (2006.01)
*B62D 25/20* (2006.01)

(52) U.S. Cl. .............. 296/209; 296/187.12; 296/146.2; 296/146.9; 296/203.03

(58) Field of Classification Search ................ 296/209, 296/146.9, 146.2, 203.02, 187.12, 193.05
See application file for complete search history.

(56) References Cited

U.S. PATENT DOCUMENTS

| | | | | |
|---|---|---|---|---|
| 2,997,329 | A * | 8/1961 | Chapman | 296/191 |
| 5,338,080 | A * | 8/1994 | Janotik et al. | 296/29 |
| 5,765,906 | A * | 6/1998 | Iwatsuki et al. | 296/203.03 |
| 6,644,723 | B2 * | 11/2003 | Motozawa | 296/187.12 |
| 6,786,534 | B1 * | 9/2004 | Peng | 296/187.08 |

* cited by examiner

*Primary Examiner*—D. Glenn Dayoan
*Assistant Examiner*—Greg Blankenship
(74) *Attorney, Agent, or Firm*—Young Basile Hanlon MacFarlane & Helmholdt, P.C.

(57) ABSTRACT

The disclosure relates to vehicles and door sills for vehicles. In one aspect, the disclosure relates to door sills having an interior channel configured to receive a retractable panel installed within a vehicle door. In another aspect, the disclosure relates to impact-absorbing door sills for motor vehicles, for example, an automobile. The disclosure also provides methods for forming a shaped composite article from a metal foam and attaching the shaped composite article to a side frame of a vehicle chassis.

24 Claims, 3 Drawing Sheets

VEHICLE DOOR SILL

TECHNICAL FIELD

The invention relates to doors and door sills for vehicles.

BACKGROUND

Passenger automobiles typically have one or more passenger entryways defined by a door sill attached to the exterior body frame of the vehicle. The vehicle door sill provides an entryway transition between the exterior of the vehicle and an interior compartment, for example, a passenger compartment. The door sill is generally configured to interface with a door connected by a hinge to the body frame at a forward position, for example, at an A-pillar of a unibody chassis. When closed, the door generally interfaces with a latching mechanism located at a rearward position, for example, at a B-pillar of a unibody chassis. The door sill provides a good seal between the door and the body frame of the vehicle, thereby reducing vibration and noise within the passenger compartment.

Door sills are commonly made from inexpensive lightweight materials such as plastics, and may be readily damaged in a collision, particularly a side impact collision. Side impact protection for a passenger seated in the passenger compartment of a vehicle is thus provided, if at all, by the vehicle frame and doors. It is known to improve passenger side impact protection by incorporating reinforcements, for example steel beams, within the doors of the vehicle. However, this adds to the cost and weight of the door and the vehicle, and can make it more difficult for a passenger to open or close the door.

It is also known to install passive side air bag assemblies to protect a passenger during a side impact with an object such as another vehicle. However, airbags also add to the cost and complexity of the vehicle, and the air bag assemblies may not provide complete passenger protection during a side impact with a massive object such as a heavy truck or concrete structure. The side air bag deployment system, which is usually built into the passenger seat or ceiling, may also negatively affect the aesthetic appearance of the vehicle interior. Airbags also do not protect the vehicle frame from damage in a side impact collision, leading to expensive repairs to the vehicle after such a collision, particularly for vehicles manufactured with a unibody frame construction.

SUMMARY

In general, the disclosure relates to door sills for vehicles. In certain embodiments, the disclosure relates to door sills having an interior channel configured to receive a retractable panel installed within a vehicle door. In additional embodiments, the disclosure relates to impact-absorbing door sills for a motor vehicle, for example, an automobile.

In one embodiment, a vehicle comprises a frame including a first frame pillar, a second frame pillar distal the first frame pillar, and a side frame member between the first frame pillar and the second frame pillar. A door comprising a retractable panel covering an opening in the door may be attached to the frame. A door sill member comprising a channel configured to receive a portion of the retractable panel, may be positioned outboard of the frame. The door sill member may extend from a front end of the first frame pillar to a rear end of the second frame pillar. The door may be movably attached to the frame proximate to the first frame pillar, and at least a portion of the door sill may be positioned to engage an inner door surface.

In certain exemplary embodiments, the vehicle is a motor vehicle, for example, an automobile. In some exemplary embodiments, the frame comprises a unibody chassis. In certain exemplary embodiments, the first frame pillar is an A-pillar of a unibody chassis. In other exemplary embodiments, the second frame pillar is a B-pillar of a unibody chassis.

In additional exemplary embodiments, the channel may have a substantially U-shape. In certain embodiments, the channel may be positioned between the door sill member and the side frame member. In some embodiments, the channel extends from a rear end of the first frame pillar to the front end of the second frame pillar. In some exemplary embodiments, the retractable panel covers the opening in the door when a lower edge of the retractable panel engages the channel. In other exemplary embodiments, the retractable panel comprises a glazing material. The glazing material may comprise glass.

In further exemplary embodiments, the door sill member comprises an elongate base member proximate the side frame member, a front side pillar extending upward from the base member and proximate the first frame pillar, and a rear side pillar extending upward from the base member and proximate the second frame pillar. In certain exemplary embodiments, the second frame pillar comprises a bulkhead member, and the rear side pillar is adjacent to and outboard of the bulkhead member.

In additional exemplary embodiments, the door sill member is a unitary part. In certain exemplary embodiments, the door sill member further comprises a side pillar extending from a position proximate the second frame pillar to a position between the first frame pillar and the second frame pillar in a direction generally away from a surface of the elongate base.

In further exemplary embodiments, the door sill member comprises an impact absorbing composite material. In further exemplary embodiments, the rear side pillar comprises an impact absorbing composite material. The impact absorbing composite material may comprise a metal foam. In some exemplary embodiments, the metal foam comprises metal particles. In certain exemplary embodiments, the metal particles comprise aluminum. In additional exemplary embodiments, the metal foam comprises a resin. In other exemplary embodiments, the door sill is connected to the side frame member using one or more of fasteners, welds, and adhesives.

In yet another embodiment, a door sill comprises an elongate base member having a front end and a rear end distal from the front end, and a channel extending at least along part of an inner edge of the elongate base member. A front side pillar extends generally upward from the front end of the elongate base member, and a rear side pillar extends between the rear end of the elongate base member forward to a position between the rear end and the front end of the elongate base member in a direction generally away from a top surface of the elongate base member. The channel is configured to receive an edge of a movable panel covering an opening in a vehicle door.

In some exemplary embodiments, the door sill is a single unitary component. In certain additional embodiments, the channel has a substantially U-shape. In additional exemplary embodiments, the channel extends from a rear end of the rear side pillar to a front end of the front side pillar.

In other exemplary embodiments, the door sill comprises an impact absorbing composite material. In certain exemplary embodiments, the rear side pillar comprises an impact absorbing composite material. In additional exemplary embodiments, the impact absorbing composite material comprises a metal foam. In certain exemplary embodiments, the metal foam comprises metal particles. The metal particles may comprise aluminum. In some exemplary embodiments, the metal foam comprises a resin.

In an additional embodiment, a method comprises forming a shaped composite article from a metal foam, and attaching the shaped composite article to a side frame of a vehicle chassis. In certain embodiments, forming comprises one or more of molding, casting or machining. In other embodiments, attaching comprises one or more of welding, fastening or adhering. In an exemplary embodiment, the shaped composite article is a vehicle door sill. In certain exemplary embodiments, the metal foam comprises metal particles. The metal particles may comprise aluminum. In additional embodiments, the metal foam comprises a resin.

The disclosure may provide one or more advantages over the prior art. Door sills according to some embodiments of the disclosure are extremely light in weight and may exhibit improved impact resistant. For example, door sills according to some embodiments of the disclosure may provide improved energy absorption in a side impact collision, thereby offering improved passenger protection in a collision. Door sills according to certain embodiments of the disclosure may also provide improved protection to the vehicle frame or chassis during a side impact, thereby reducing vehicle repair cost and complexity following a collision.

In additional embodiments, door sills according to the disclosure may provide improved noise isolation and/or vibration dampening for passengers riding in a vehicle. In other embodiments, door sills according to the disclosure may provide improved fire resistance and thermal insulating properties for a vehicle passenger compartment. In certain additional embodiments, door sills according to the disclosure may provide an improved aesthetic appearance to a vehicle, particularly when used with a door having a retractable panel positioned within the door.

The details of one or more embodiments of the disclosure are set forth in the accompanying drawings and the description below. Other features, objects, and advantages of the disclosure will be apparent from the description and drawings, and from the claims.

DETAILED DESCRIPTION

The disclosure will be set forth with reference to the figures. Although the figures illustrate exemplary embodiments of door sills for an automobile, one skilled in the art will understand that the disclosure is not limited in application to automobiles. Other vehicles, both motorized and non-motorized, may be configured with a door sill according to the present disclosure. Exemplary vehicles that may be advantageously configured with a door sill according to the present disclosure include, but are not limited to, vans, trucks, sport utility vehicles, all terrain vehicles, motor homes, watercraft, and aircraft.

It will therefore be understood that the disclosure is not limited to the specific exemplary embodiments described herein, but includes all functional and structural equivalents. Furthermore, it should be understood that by specifying particular items or an order of items in the present disclosure (e.g., an order of steps to be performed), it is not meant to preclude additional items or intermediates between the items specified, as long as the specified items appear in the order as specified.

The foregoing summary of the disclosure is not intended to describe each disclosed embodiment or every implementation of the present disclosure. The details of one or more embodiments of the disclosure are set forth in the accompanying drawings and the description below. Other features, objects, and advantages of the disclosure will be apparent from the following detailed description and drawings, and from the claims.

Figure 1:
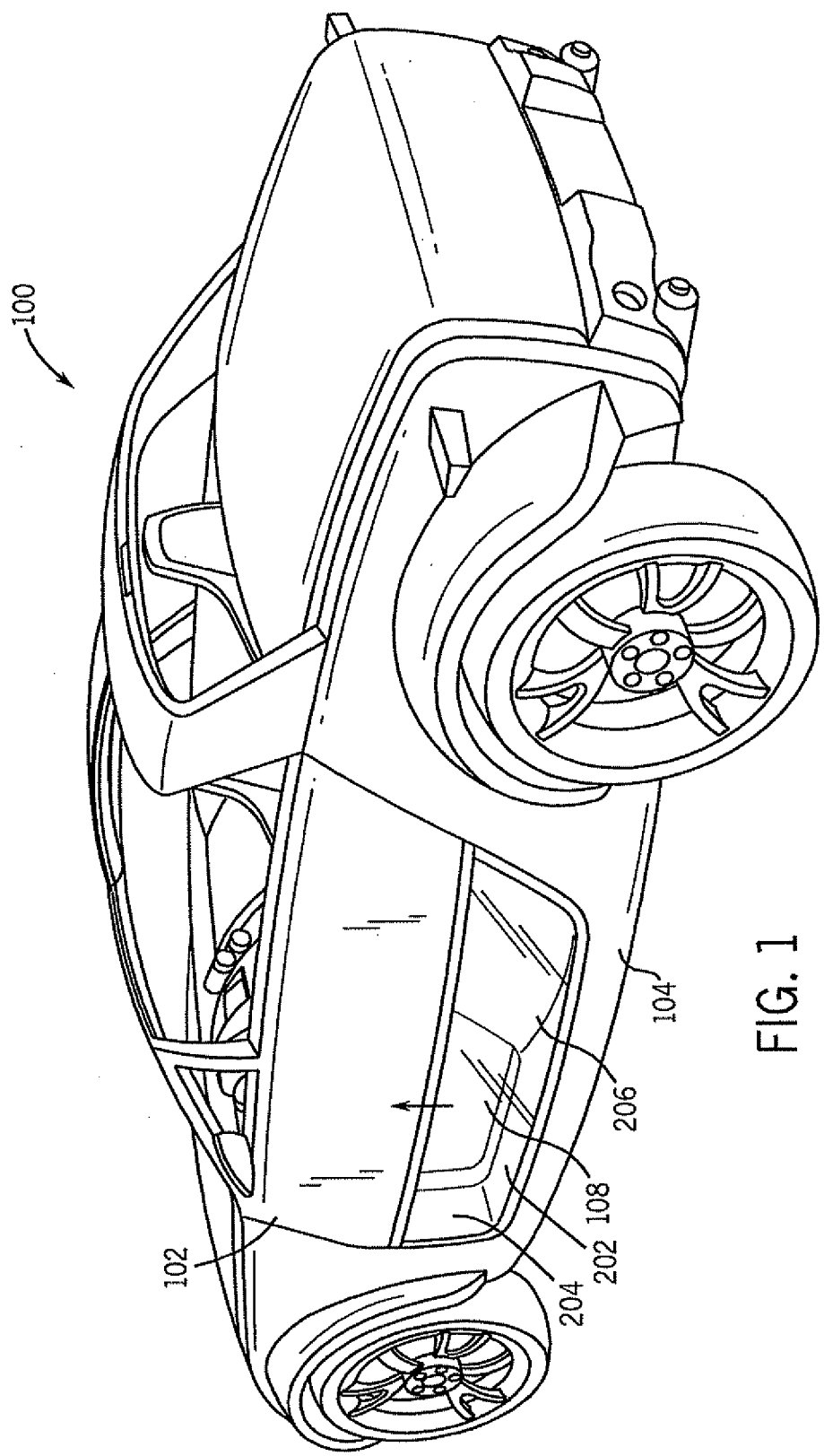
FIG. 1 is an illustration of a left side perspective view of a vehicle that includes an exemplary door sill configured to receive a retractable door panel.

FIG. 1 is an illustration of a left side perspective view of a vehicle 100 that includes an exemplary door sill configured to receive a retractable door panel 108. Vehicle 100 provides transportation to one or more passengers, where the vehicle may utilize any type of motor or energy source to transport the passengers from one point to another point. As described herein, the exemplary vehicle 100 is a two-door automobile with a front mounted internal combustion engine. More specifically, vehicle 100 is a roadster designed with performance, utility, and aesthetics in mind. While a particular example of vehicle 100 is described herein as an example, other types of vehicles are contemplated and within the scope of the specification. For example, vehicle 100 may be a different type of automobile such as sedan, sports utility vehicle (SUV), truck, or compact vehicle. In other embodiments, vehicle 100 may utilize a diesel, hybrid, electric, or hydrogen engine to drive the wheels of the vehicle.

The size of vehicle 100 may vary as desired. Typically, vehicle 100 may have a size suitable for holding human passengers of adult age, where the passengers are of average height and weight. Interior structures such as seats, steering wheels, and controls may be movable to accommodate varying sized passengers.

Vehicle 100 may include many more components, elements or features not explicitly described herein. Such features may be identified in FIG. 1 or may be common to automobile functionality. Other features may be described in greater detail herein and in co-pending U.S. patent application Ser. No. 11/317,662, filed Dec. 23, 2005 by R. Plavetich et al. and titled "Detachable Windshield," the entire contents of which are incorporated herein by reference.

Vehicle 100 includes a door 102 (shown as a driver's side door in FIG. 1 for illustrative purposes only) movably attached to the vehicle 100 and configured to interface with a door sill member 104 connected to a side frame member external to the vehicle frame (both not visible in FIG. 1). The door sill member 104 has an elongate base member 202 having a front end and a rear end distal from the front end, and a channel extending at least along part of an inner edge of the elongate base member (not visible in FIG. 1). The channel (not visible in FIG. 1) is configured to receive an edge of a movable panel 108 covering an opening in the vehicle door 102. A front side pillar 204 extends generally upward from the front end of the elongate base member 202, and a rear side pillar 206 extends between the rear end of the elongate base member forward to a position between the rear end and the front end of the elongate base member in a direction generally away from a top surface of the elongate base member.

Figure 2:
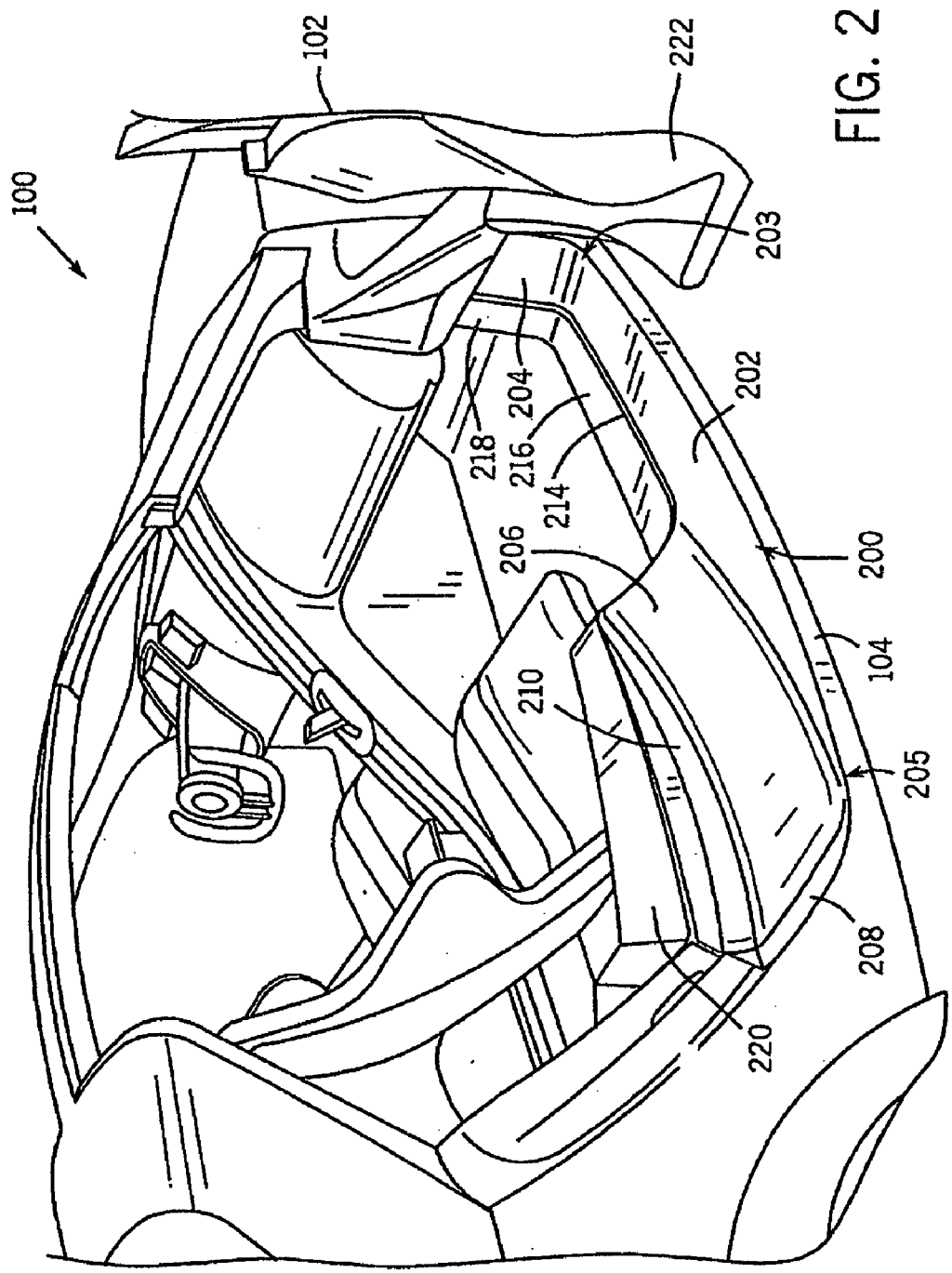
FIG. 2 is an illustration of an enlarged right side perspective view of a vehicle that includes an exemplary door sill configured to receive a retractable door panel and having an impact absorbing side pillar.

FIG. 2 is an illustration of an enlarged right side perspective view of a vehicle that includes an exemplary door 102 (shown as a right passenger's side door in FIG. 2 for illustrative purposes only) configured to interface to a door sill member 104 attached to a side frame member 216 of the vehicle 100. The door sill member 104 attached to a side frame member 216 of the vehicle 100. The door sill member 104 includes an elongate base member 202 connected to the side frame member 216 external to the vehicle frame. The door sill member 104 has a channel 214 situated between the side frame member 216 and the door 102. The channel 218 is configured to receive an edge of a retractable panel (not visible in FIG. 2) covering an opening in the door.

The side frame member 216 includes a first frame pillar 218 and a second frame pillar 220 distal from the first frame pillar, and the door sill member 104 extends from a front end of the first frame pillar 218 to a rear end of the second frame pillar 220. The door 102 is shown movably connected to the frame proximate to the first frame pillar 218, for example, with a hinge. At least a portion of the door sill member 104 may be positioned to engage an inner surface 222 of the door 102.

The vehicle frame may comprise a unibody chassis as known to those skilled in the art. The first frame pillar 218 may thus be an "A-pillar" of a unibody chassis. The second frame pillar 220 may be a "B-pillar" of a unibody chassis. As known to those skilled in the art, the "A-pillar" forms a forward side edge of the passenger compartment of an unibody chassis, and generally extends from the vehicle roof (not shown in FIG. 2) downward along the edge of the windshield to intersect the side frame member 216 at a forward position indicated by reference arrow 203. The "B-pillar" forms a rearward side edge of the passenger compartment of an unibody chassis. In certain exemplary embodiments illustrated in FIG. 2, the second frame pillar 220 may include a bulkhead member (the rear side pillar 206 is shown adjacent to and outboard of the bulkhead member in FIG. 2).

The door sill may have a front side pillar 204 extending generally upward from the front end 203 of the elongate base member 202. The door sill may additionally have a rear side pillar 206 extending between the rear end 205 of the elongate base member 202 forward to a position between the rear end 205 and the front end 203 of the elongate base member 202 in a direction generally away from a top surface 200 of the elongate base member 202. The rear side pillar 206 may have an upper surface 210 and rear surface 208 configured to interface with an inner surface 222 of the door 102.

Channel 214 may have a generally U-shape, as shown in FIG. 2. Alternatively, channel 214 may have other shapes according to a desired aesthetic effect. Channel 214 preferably has a shape configured to interface with a retractable panel such as retractable panel 108 (shown in FIG. 1) positioned within the door 102. Preferably, channel 214 interfaces with one or more edges of panel 108 to form a water and airtight seal. In certain embodiments, the channel 214 may extend from a rear end of the first frame pillar 218 to a front end of the second frame pillar 220, as illustrated in FIG. 2.

Figure 3:
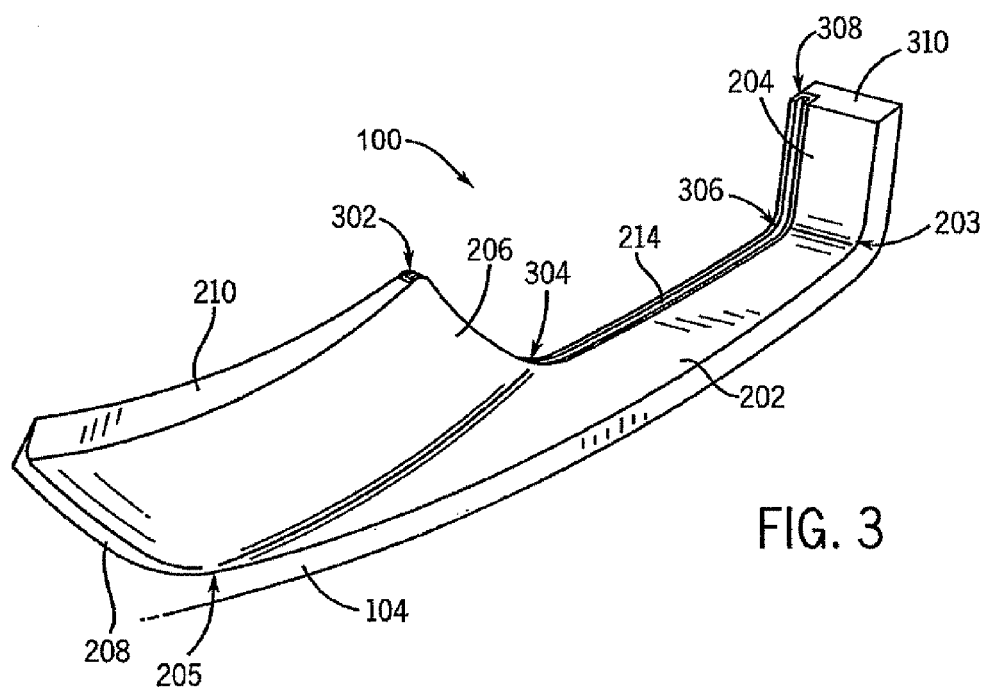
FIG. 3 is an illustration of a detailed right side perspective view of a vehicle door sill including a channel configured to receive a retractable door panel and having an impact absorbing side pillar.

FIG. 3 is an illustration of a detailed right side perspective view of a vehicle door sill member 104 (shown as a right passenger's side door in FIG. 3 for illustrative purposes only) having an impact absorbing side pillar 206. The door sill member 104 includes an elongate base member 202 having a front end 203 and a rear end 205 distal from the front end, and a channel 214 extending at least along part of an inner edge of the elongate base member 202. A front side pillar 204 extends generally upward from the front end 203 of the elongate base member 202, and a rear side pillar 206 extends between the rear end 205 of the elongate base member 202 forward to a position between the rear end 205 and the front end 203 of the elongate base member 202 in a direction generally away from a top surface 200 of the elongate base member 202. The channel 214 is configured to receive an edge of a movable (e.g. a retractable) panel covering an opening in a vehicle door (both not shown in FIG. 3).

With particular reference to FIG. 3, in some embodiments, the rear side pillar 206 may have an exterior surface that is arcuate or curved inward, forming an exterior body when interfaced to the interior surface of a door, such as door 102 in FIG. 2. Vehicle door sills having curved surfaces may be made, for example, using casting, molding or machining methods as described herein. Curved surfaces may reduce drag and/or improve the aesthetic appearance of the vehicle exterior.

In some exemplary embodiments, the door sill may be a single unitary component. In certain additional embodiments, the channel has a generally U-shape. In additional exemplary embodiments, the channel extends from a rear end of the rear side pillar to a front end of the front side pillar. In certain embodiments, the channel 214 may extend from a front end 308 configured to interface to a rear end of a first frame pillar (e.g. first frame pillar or "A-pillar" 218 of FIG. 2), to a rear end 302 configured to interface to a front end of a second frame pillar (e.g. second frame pillar or "B-pillar 220 FIG. 2). A top surface 310 of front side pillar 204 is preferably configured to interface with a forward inner surface of a vehicle door (not shown in FIG. 3). A top surface 210 of rear side pillar 206 may preferably be configured to interface with a rearward inner surface of the vehicle door (not shown in FIG. 3). The rear side pillar 206 may have rear surface 208 configured to interface with a rearward inner surface of the vehicle door, for example, rearward inner surface 222 of the door 102 shown in FIG. 2. Preferably, top surface 310, top surface 210 and rear surface 208 each interface with the vehicle door to form a water and airtight seal.

Figure 4:
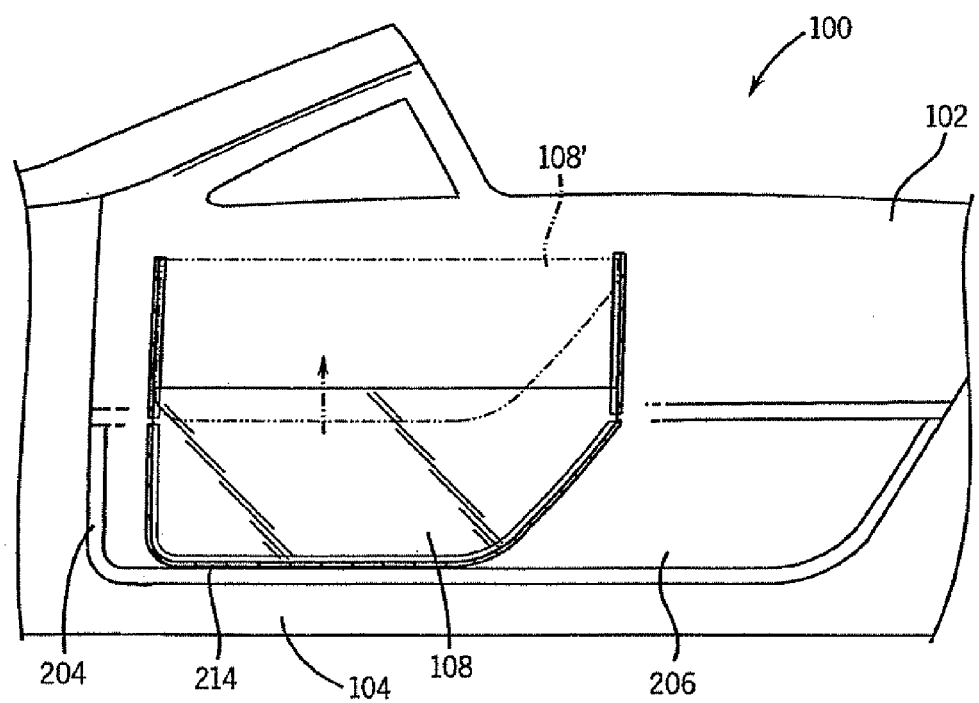
FIG. 4 is an illustration of a side view of a vehicle door including a retractable door panel positioned to engage a channel within a door sill.

FIG. 4 is an illustration of a side view of a vehicle 100 having a door 102 (shown as a left driver's side door in FIG. 4 for illustrative purposes only) including a retractable panel 108 positioned to engage a channel 214 within a door sill member 104. The door sill member 104 includes an elongate base member 202 having a front end 203 and a rear end 205 distal from the front end, and a channel 214 extending at least along part of an inner edge of the elongate base member 202. A front side pillar 204 extends generally upward from the front end 203 of the elongate base member 202, and a rear side pillar 206 extends between the rear end 205 of the elongate base member 202 forward to a position between the rear end 205 and the front end 203 of the elongate base member 202 in a direction generally away from a top surface 200 of the elongate base member 202.

The channel 214 is configured to receive an edge of a movable (e.g. a retractable) panel covering an opening in a vehicle door.

The door sill may have a front side pillar 204 extending generally upward from the elongate base member 202. The door sill may additionally have a rear side pillar 206 extending in a direction generally away from a top surface 200 of the elongate base member 202.

In some exemplary embodiments, the retractable panel 108 covers an opening in the door 102 when a lower edge of the retractable panel 108 engages the channel 214. In other exemplary embodiments, the retractable door panel 108' reveals an opening through the door 102 when a lower edge of the retractable panel disengages the channel 214, that is, when the retractable door panel 108 is retracted from a closed position 108 to an open position 108'.

In exemplary embodiments, the retractable panel 108 comprises a glazing material. Preferably, the glazing material is substantially transparent. The glazing material may comprise glass. Preferably, the glazing material comprises safety glass. In some embodiments, the glazing material may be tinted to at least partially absorb light passing through the glazing material.

In additional exemplary embodiments, the door sill member 104 may comprise an impact absorbing composite material. In certain exemplary embodiments, the rear side pillar 206 comprises an impact absorbing composite material. The impact absorbing composite material may comprise a metal foam. A metal foam is a gas dispersion in a continuous solid or liquid phase comprising at least one metal. Preferably, the metal foam comprises metal particles forming at least a portion of the continuous solid or liquid phase. The metal particles may comprise aluminum. Suitable commercially available metal foams include Alulight® SAF solid aluminum foams manufactured by Alulight® International, GmbH, Ranshofen, Austria. Additional suitable metal foams include both solid and liquid (i.e. Alusion®) aluminum foams manufactured by Cymat Corp., Mississauga, Ontario, Canada.

In some exemplary embodiments, the metal foam comprises a resin. Suitable resins include poly(acrylates) and poly(methacrylates), polyurethanes, poly(isocyanates), epoxy functional polymers and copolymers, and the like. If a resin is used to form the metal foam, the resin is preferably a curable resin in the form of a liquid in the uncured state, the liquid resin converting to a solid state upon curing of the resin. In some embodiments, the curing reaction releases gas bubbles (for example, water vapor, nitrogen or carbon dioxide) in the liquid, thereby generating the foam.

In an additional embodiment, a method comprises forming a shaped composite article from a metal foam, and attaching the shaped composite article to a side frame of a vehicle chassis. In certain embodiments, forming comprises one or more of molding, casting or machining. Curable liquid resins are particularly suited for use in forming composite shaped articles by casting or molding. Metal particles may be dispersed in the curable liquid resin to form generally fluid solid/liquid dispersion. The solid/liquid dispersion may be added to a mold defining a desired shaped article. The solid/liquid dispersion may be added to at least partially fill the mold, and the curing reaction initiated, for example, by adding a catalyst or free radical initiator, or by heating the solid/liquid dispersion within the mold. Upon initiation of the curing reaction, a gas may be released as a by-product of the curing reaction to generate a solid metal foam within the mold upon curing of the resin.

Alternatively, a gas may be introduced into the solid/liquid dispersion within the mold, for example by sparging finely divided gas bubbles into the solid/liquid dispersion, thereby generating a solid foam within the mold upon curing of the resin. The formed article may be released from the mold, for example, by separating parts of the mold or by breaking the mold, upon curing of the resin and formation of the solid metal foam.

In an exemplary embodiment, the shaped composite article is a vehicle door sill. In certain embodiments, the shaped composite may be attached to the exterior frame of a vehicle using, for example, welding, fastening or adhering. Fastening may be achieved using fasteners such as screws, bolts, rivets, and the like. Fastening may be achieved by fitting the interior edge of the door sill and the adjoining edge of the vehicle exterior frame member with a plurality of mounting holes. Fasteners may be inserted through one or more of the mounting holes in the interior edge of the door sill and the adjoining edge of the vehicle frame member, and fastened to mount the door sill to the exterior vehicle frame.

Adhering may be achieved using an adhesive, for example an adhesive tape or glue, interposed between the exterior frame of the vehicle and an interior edge of the door sill member. Use of adhesives may have advantages, as adhesives do not generally require that holes be bored into the inner edge of the door sill or the exterior frame member of the vehicle, thereby reducing manufacturing cost and complexity.

Metal foams used according to some embodiments of the present invention may exhibit a cellular structure, for example, an open or closed cellular structure. Preferably, a metal foam having a closed cellular structure is used to produce a shaped composite article for application to a vehicle. In some embodiments, a coating may be applied to the surface of the metal foam comprising the shaped article to seal the surface of the foam or to obtain an aesthetically pleasing effect. For example, the surface of the metal foam may be painted, coated, vacuum metallized, or otherwise treated to improve the appearance or performance of the metal foam.

Various embodiments of the disclosure have been described. These and other embodiments are within the scope of the following claims.

The invention claimed is:

1. A vehicle comprising:
 a frame comprising a first frame pillar, a second frame pillar distal the first frame pillar, and a side frame member between the first frame pillar and the second frame pillar;
 a door attached to the frame, wherein the door further comprises a retractable panel covering an opening in the door; and
 a door sill member extending from a front end of the first frame pillar to a rear end of the second frame pillar, wherein the door sill member is outboard of the frame, and wherein the door sill member comprises a channel configured to receive a portion of the retractable panel.

2. The vehicle of claim 1, wherein the channel is substantially U-shaped and positioned between the door sill member and the side frame member.

3. The vehicle of claim 2, wherein the channel extends from a rear end of the first frame pillar to a front end of the second frame pillar.

4. The vehicle of claim 2, wherein the channel is configured to accept an edge of the retractable panel.

5. The vehicle of claim 1, wherein the door sill member comprises an elongate base member proximate the side frame member, a front side pillar extending upward from the base member and proximate the first frame pillar, and a rear side pillar extending upward from the base member and proximate the second frame pillar.

6. The vehicle of claim 5, wherein the second frame pillar comprises a bulkhead member, and wherein the rear side pillar is adjacent to and outboard of the bulkhead member.

7. The vehicle of claim 5, wherein the rear side pillar of the door sill member comprises an impact absorbing composite material.

8. The vehicle of claim 1, wherein the door sill member comprises an impact absorbing composite material.

9. The vehicle of claim 8, wherein the impact absorbing composite material comprises a metal foam.

10. The vehicle of claim 9, wherein the metal foam comprises metal particles.

11. The vehicle of claim 10, wherein the metal particles comprise aluminum.

12. The vehicle of claim 11, wherein the metal foam further comprises a resin.

13. The vehicle of claim 1, wherein the door sill member is connected to the side frame member using one or more of fasteners, welds, and adhesives.

14. The vehicle of claim 1, wherein the door sill member is connected to the side frame member with an adhesive.

15. A door sill comprising:
an elongate base member having a front end and a rear end distal from the front end;
a front side pillar extending generally upward from the front end of the elongate base;
a rear side pillar extending between the rear end of the elongate base member forward to a position between the rear end and the front end of the elongate base member in a direction generally away from a top surface of the elongate base member; and
a channel extending from the front side pillar to the rear side pillar along an inner edge of the elongate base member, wherein the channel is configured to receive a portion of a movable panel covering an opening in a vehicle door.

16. The door sill of claim 15, wherein the door sill is a single unitary component.

17. The door sill of claim 15, wherein the channel is substantially U-shaped.

18. The door sill of claim 15, wherein the channel extends from a rear end of the rear side pillar to a front end of the front side pillar.

19. The door sill of claim 15, comprising an impact absorbing composite material.

20. The door sill of claim 15, wherein the rear side pillar comprises an impact absorbing composite material.

21. The door sill of claim 20, wherein the impact absorbing composite material comprises a metal foam.

22. The door sill of claim 21, wherein the metal foam comprises metal particles.

23. The door sill of claim 22, wherein the metal particles comprise aluminum.

24. The door sill of claim 21, wherein the metal foam further comprises a resin.

* * * * *